UNITED STATES PATENT OFFICE.

GEORGE H. MOORE, OF NORWICH, CONNECTICUT.

IMPROVEMENT IN FILTERS.

Specification forming part of Letters Patent No. 201,354, dated March 19, 1878; application filed August 9, 1877.

*To all whom it may concern:*

Be it known that I, GEORGE H. MOORE, of Norwich, in the county of New London and State of Connecticut, have invented certain new and useful Improvements in Filters, of which the following is a specification:

The object of this invention is to remove from water or other liquids extraneous particles that may be therein, by filtering said liquids through a porous stone-like substance—*i. e.*, a filter—which is hereinafter more fully explained.

To make a porous stone-like substance—*i. e.*, a filter—for filtering liquids, I mix together, by measure, one part of hydraulic cement and five parts of clean, coarse, screened sand, also using one part of water to moisten each seven parts of the mixed cement and sand. The moistened mixture is then molded of the desired shape. After the cement has thoroughly "set," the said moistened mixture is porous, stone-like, and ready for use as a filter.

Hydraulic lime, or a mixture of hydraulic lime and lime, or any hydraulic cementitious mixture, may be used as the cementing medium to make a filter; but I prefer Portland cement; and I particularly claim a hydraulic cement for the purpose herein indicated.

The porosity of this filter may be varied by increasing or decreasing either the proportion of cement or of sand above mentioned, and a greater or less quantity of water than the proportion herein stated may be used without departing from the spirit of this invention.

Having thus explained my invention, what I claim, and desire to secure by Letters Patent of the United States, is—

A filter made of a moistened mixture of hydraulic cement and sand, substantially as and for the purpose herein described.

In testimony that I claim the foregoing as my own I have hereunto affixed my signature in presence of two witnesses.

GEORGE H. MOORE.

Witnesses:
   H. H. BURNHAM,
   WM. CARUTHERS.